(12) United States Patent
Holt et al.

(10) Patent No.: US 8,726,625 B2
(45) Date of Patent: May 20, 2014

(54) COMBINED CYCLE POWER PLANT

(75) Inventors: Joel Donnell Holt, Scotia, NY (US);
Gordon Raymond Smith, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 13/085,167

(22) Filed: Apr. 12, 2011

(65) Prior Publication Data

US 2012/0260621 A1    Oct. 18, 2012

(51) Int. Cl.
*F02C 6/00* (2006.01)
*F02G 1/00* (2006.01)
*F02G 3/00* (2006.01)

(52) U.S. Cl.
USPC .............. 60/39.182; 60/657; 60/658; 60/646; 60/39.13; 122/460; 122/461; 122/472; 122/488

(58) Field of Classification Search
USPC ......... 60/39.182, 779, 39.091, 657, 658, 646; 60/39.13; 122/460, 461, 472, 488
See application file for complete search history.

(56) References Cited

U.S. PATENT DOCUMENTS

| | | | | |
|---|---|---|---|---|
| 3,220,193 | A * | 11/1965 | Strohmeyer, Jr. | 60/659 |
| 4,703,722 | A | 11/1987 | Fukayama | |
| 4,790,269 | A * | 12/1988 | Hamill et al. | 122/406.5 |
| 5,628,179 | A * | 5/1997 | Tomlinson | 60/783 |
| 6,062,017 | A * | 5/2000 | Liebig | 60/39.182 |
| 6,237,542 | B1 | 5/2001 | Nakajo et al. | |
| 6,338,241 | B1 * | 1/2002 | Shibuya et al. | 60/39.182 |
| 6,393,822 | B2 * | 5/2002 | Nagashima | 60/783 |
| 2010/0236240 | A1 * | 9/2010 | Hu et al. | 60/653 |

* cited by examiner

*Primary Examiner* — Craig Kim
(74) *Attorney, Agent, or Firm* — Cantor Colburn LLP

(57) ABSTRACT

A combined cycle power plant is provided and includes a gas turbine engine to generate power from combustion of a fuel and air mixture, a heat recovery steam generator (HRSG) disposed downstream from the gas turbine engine to receive heat energy from the gas turbine engine from which steam is produced, the HRSG including a superheating element and a drum element, and a steam turbine engine to be receptive of the steam produced in the HRSG and to generate power from the received steam, the HRSG further including a valve operably disposed to isolate the superheating element from the drum element when a risk of condensate formation in the HRSG exists.

14 Claims, 1 Drawing Sheet

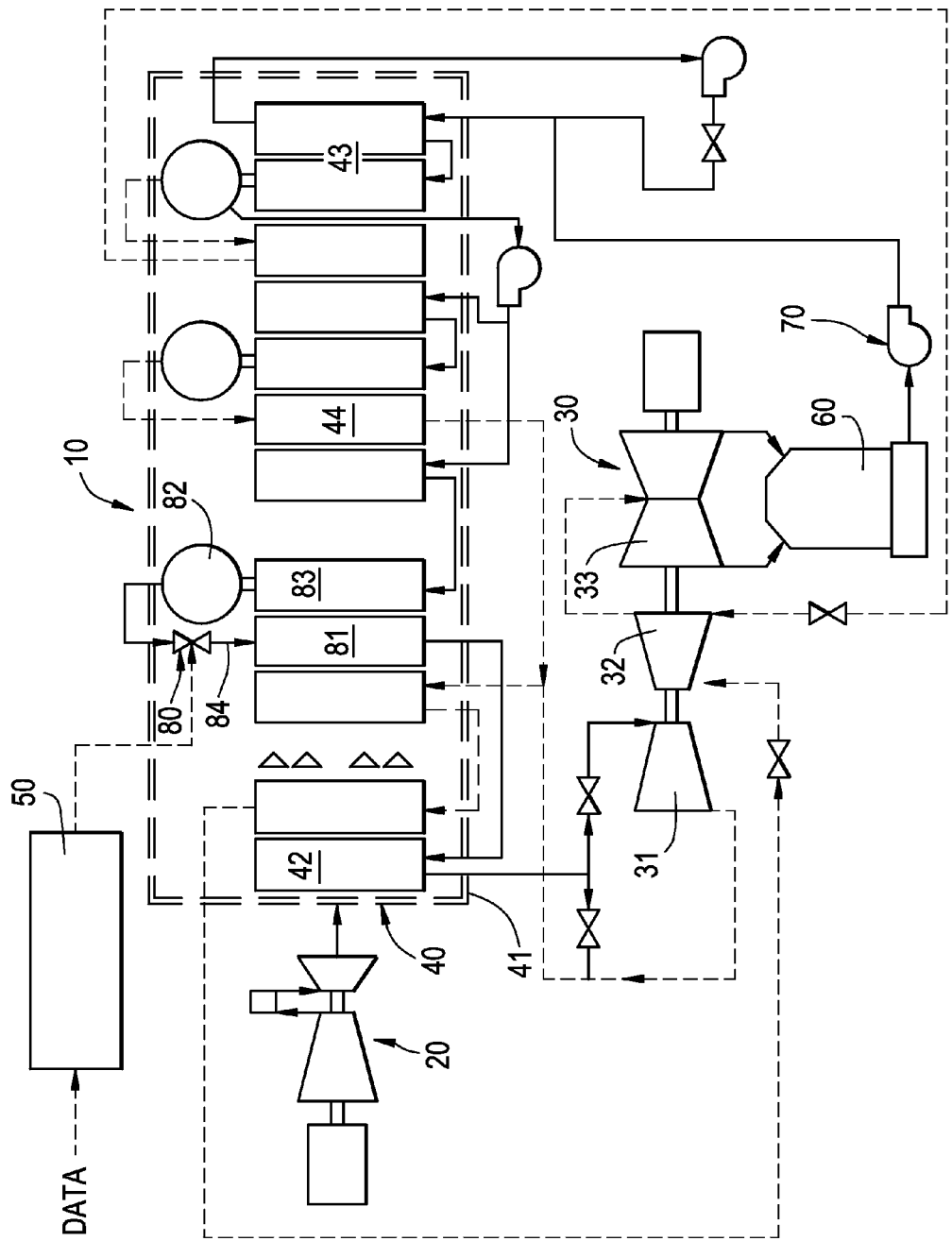

COMBINED CYCLE POWER PLANT

BACKGROUND OF THE INVENTION

The subject matter disclosed herein relates to a combined cycle power plant and, more particularly, to a heat recovery steam generator (HRSG) of a combined cycle power plant.

In a combined cycle power plant, a gas turbine engine generates power and electricity from the combustion of a mixture of fuel and air. The heat energy from this combustion is transmitted to a heat recovery steam generator (HRSG), which converts the heat into steam. The steam is then communicated to a steam turbine engine where additional power and electricity are produced.

When combined cycle power plants are deployed in the field, they are often run for certain periods of time when power demands on grids they supply are expected to be greatest. Once these periods end, the plants are shut down with the shut down process often requiring that the HRSG be purged of remaining fuel and air so that subsequent startups can be conducted safely. These purge events are conducted by running the gas turbine engine without combustion so that heated air is pumped through the HRSG. The purge events along with other similar events, such as forced cooling and gas turbine engine shut down events, can lead to condensation in the HRSG that can damage various components within the HRSG and cause potentially premature failure.

BRIEF DESCRIPTION OF THE INVENTION

According to one aspect of the invention, a combined cycle power plant is provided and includes a gas turbine engine to generate power from combustion of a fuel and air mixture, a heat recovery steam generator (HRSG) disposed downstream from the gas turbine engine to receive heat energy from the gas turbine engine from which steam is produced, the HRSG including a superheating element and a drum element, and a steam turbine engine to be receptive of the steam produced in the HRSG and to generate power from the received steam, the HRSG further including a valve operably disposed to isolate the superheating element from the drum element when a risk of condensate formation in the HRSG exists.

According to another aspect of the invention, a combined cycle power plant is provided and includes a gas turbine engine to generate power from combustion of a fuel and air mixture, a heat recovery steam generator (HRSG) disposed downstream from the gas turbine engine to receive heat energy from the gas turbine engine from which steam is produced, the HRSG including a superheating element, a drum element and a valve operably disposed to isolate the superheating element from the drum element, a steam turbine engine to be receptive of the steam produced in the HRSG and to generate power from the received steam and a controller operably coupled to the valve to open and close the valve when a risk of condensate formation in the HRSG exists.

According to yet another aspect of the invention, a heat recovery steam generator for a combined cycle power plant is provided and includes a vessel in which steam to be communicated to a steam turbine engine is generated from exhaust produced in a gas turbine engine, the vessel being formed with high, intermediate and low pressure sections disposed sequentially downstream from the gas turbine engine, at least one or more of the high, intermediate and low pressure sections including a superheating element in which a fluid is superheated, a drum element to contain the fluid at a saturated state, a conduit by which the fluid is communicated from the drum element to the superheating element, and a valve operably disposed along the conduit to isolate the superheating element from the drum element when a risk of condensate formation at the superheating element exists.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The sole FIGURE is a schematic illustration of a combined cycle power plant.

The detailed description explains embodiments of the invention, together with advantages and features, by way of example with reference to the drawings.

DETAILED DESCRIPTION OF THE INVENTION

With reference to the sole FIGURE, a combined cycle power plant 10 is provided. The power plant 10 includes a gas turbine engine 20, a steam turbine engine 30, heat recovery steam generator 40 and a controller 50. The gas turbine engine 20 generates power and electricity from the combustion of a mixture of fuel and air and produces an exhaust stream of high temperature fluids. The steam turbine engine 30 generates additional power and electricity from steam. The HRSG 40 is disposed downstream from the gas turbine engine 20 and is receptive of the high temperature fluids produced by the gas turbine engine 20. The HRSG 40 generates the steam from the heat energy of these high temperature fluids and the steam is to be communicated to the steam turbine engine 30 for the additional generation of power and electricity.

The HRSG 40 is a vessel 41 that is formed with a high pressure section 42, which is disposed proximate to the gas turbine engine 20, a low pressure section 43, which is disposed remotely from the gas turbine engine 20 and an intermediate pressure section 44, which is interposed between the high and low pressure sections 42 and 43. With this construction, the high pressure section 42 generates high pressure steam from the high temperature fluids produced and exhausted by the gas turbine engine 20 at temperatures at or above about 1,100-1,200° Fahrenheit. In so doing, the high pressure section 42 removes heat from the high temperature fluids, which then pass to the intermediate and low pressure sections 44 and 43. There, additional heat is removed from the high temperature fluids in the generation of intermediate and low pressure steam, respectively. The high, intermediate and low pressure steam is then communicated to the steam turbine engine 30 where high, intermediate and low pressure sections thereof 31, 32 and 33 derive a significant amount of energy from the steam for the generation of the additional power and electricity. The steam is then condensed in condenser 60 and pumped by pump 70 back to the HRSG 40.

The HRSG 40 includes a valve 80, which is operably disposed to isolate a superheating element 81, such as a high pressure superheater, from a drum element 82 as will be described below. At least one or more of the high pressure section 42, the intermediate pressure section 44 and the low pressure section 43 of the HRSG 40 includes an evaporator element 83, such as a high pressure evaporator, which is disposed upstream from the drum element 82. The evaporator element 83 supplies the drum element 82 with fluid at a saturated state as the fluid is heated by gas turbine engine 20 exhaust in the HRSH 40 and pressurized. In addition, the at least one or more of the high pressure section 42, the intermediate pressure section 44 and the low pressure section 43 of the HRSG 40 further includes a conduit 84 by which the fluid is communicated from the drum element 82 to the superheating element 81. The valve 80 is operably disposed along the conduit 84.

In accordance with embodiments, the valve 80 may be manually opened and closed or automatically opened and closed. Where the valve 80 is automatically opened and closed, the combined cycle power plant 10 may further include the controller 50, which is operably coupled to the valve 80 and which is configured to open and close the valve 80 when a risk of condensate formation in the HRSG 40 exists. More particularly, the controller 50 opens and closes the valve 80 when a risk of condensate formation at the superheating element 81 exists.

The controller 50 may include an actuator, a processing unit and a memory. The memory may be embodied as a non-transitory computer or machine readable medium having executable instructions stored thereon. When executed, these executable instructions instruct the processing unit to cause the actuator to open and close the valve 80 in accordance with predefined algorithms.

For example, the processing unit of the controller 50 may determine that the risk exists and is unacceptably high in accordance with condition measurements of the exhaust produced and outputted by the gas turbine engine 20 and/or in accordance with condition measurements in the drum and superheating elements 82 and 81. That is, if the exhaust is deemed to be hotter than the fluid (based on input data reflective of temperature and pressure measurements thereof) that would be supplied to the superheating element 81 from the drum element 82, the controller 50 will close the valve 80 to prevent such flow. Thereafter, once the risk of condensation is determined to be within acceptable parameters, the controller 50 will reopen the valve 80.

In accordance with further examples, the controller 50 may be programmed or otherwise instructed to close the valve 80 during purge events, during gas turbine engine 20 forced cooling events and/or during gas turbine engine 20 shut down events. As mentioned above, purge events occur following normal operations of the combined cycle power plant 10 whereby the gas turbine engine 20 is run without combustion such that heated air is pumped into the HRSG 40 to clear the HRSG 40 of fuel and gases. In these cases, the heated air may be deemed to be hotter than the fluid, which would be supplied to the superheating element 81 form the drum element 82 and, accordingly, the controller 50 will close the valve 80 to prevent such flow until the risk of condensation is once again within acceptable parameters.

With the flow of fluid from the drum element 82 to the superheating element 81 closed off, condensation on the superheating element 81 in the HRSG 40 may be avoided. In this way, it may be ensured that the superheating element 81 will be dry when the HRSG is placed in a maintenance lay-up. The dryness of the superheating element 81 can thus prevent damage related to such condensation and premature failure of the HRSG 40 may be correspondingly avoided.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant, comprising:
   a gas turbine engine to generate power from combustion of a fuel and air mixture;
   a heat recovery steam generator (HRSG) disposed downstream from the gas turbine engine to receive heat energy from the gas turbine engine from which steam is produced, the HRSG including a superheating element and a drum element; and
   a steam turbine engine to be receptive of the steam produced in the HRSG and to generate power from the received steam,
   the HRSG further including a valve operably disposed to isolate the superheating element from the drum element when a risk of condensate formation in the HRSG exists, and
   the power plant further comprising a controller operably coupled to the valve, the controller being configured to open the valve and to close the valve when the risk of the condensate formation at the superheating element in the HRSG is present due to an exhaust temperature of the gas turbine engine exceeding a temperature of fluid to be supplied from the drum element to the superheating element based on input data reflective of temperature and pressure measurements of gas turbine exhaust.

2. The combined cycle power plant according to claim 1, wherein the HRSG is formed with a high pressure section proximate to the gas turbine engine, a low pressure section remote from the gas turbine engine and an intermediate pressure section interposed between the high and low pressure sections.

3. The combined cycle power plant according to claim 2, wherein at least one or more of the high, intermediate and low pressure sections comprises:
   an evaporator element disposed upstream from the drum element to supply the drum element with fluid at a saturated state; and
   a conduit by which the fluid is communicated from the drum element to the superheating element, the valve being operably disposed along the conduit.

4. The combined cycle power plant according to claim 1, wherein the controller determines the risk exists in accordance with condition measurements of the exhaust and/or condition measurements in the drum and superheating elements.

5. The combined cycle power plant according to claim 1, wherein the valve is closed during purge events.

6. The combined cycle power plant according to claim 1, wherein the valve is closed during gas turbine engine forced cooling events.

7. The combined cycle power plant according to claim 1, wherein the valve is closed during gas turbine engine shut down events.

8. A combined cycle power plant, comprising:
   a gas turbine engine to generate power from combustion of a fuel and air mixture;
   a heat recovery steam generator (HRSG) disposed downstream from the gas turbine engine to receive heat energy from the gas turbine engine from which steam is produced, the HRSG including a superheating element, a drum element and a valve operably disposed to isolate the superheating element from the drum element;

a steam turbine engine to be receptive of the steam produced in the HRSG and to generate power from the received steam; and a controller operably coupled to the valve, the controller being configured to open the valve and to close the valve when a risk of condensate formation at the superheating element in the HRSG exists due to an exhaust temperature of the gas turbine engine exceeding a temperature of fluid to be supplied from the drum element to the superheating element based on input data reflective of temperature and pressure measurements of gas turbine exhaust.

9. The combined cycle power plant according to claim 8, wherein the HRSG is formed with a high pressure section proximate to the gas turbine engine, a low pressure section remote from the gas turbine engine and an intermediate pressure section interposed between the high and low pressure sections.

10. The combined cycle power plant according to claim 9, wherein at least one or more of the high, intermediate and low pressure sections comprises:

an evaporator element disposed upstream from the drum element to supply the drum element with fluid at a saturated state; and a conduit by which the fluid is communicated from the drum element to the superheating element, the valve being operably disposed along the conduit.

11. The combined cycle power plant according to claim 8, wherein the controller determines the risk exists in accordance with condition measurements of the exhaust and/or condition measurements in the drum and superheating elements.

12. The combined cycle power plant according to claim 8, wherein the controller closes the valve during purge events, gas turbine engine forced cooling events and gas turbine engine shut down events.

13. A heat recovery steam generator for a combined cycle power plant, comprising:

a vessel in which steam to be communicated to a steam turbine engine is generated from exhaust produced in a gas turbine engine, the vessel being formed with high, intermediate and low pressure sections disposed sequentially downstream from the gas turbine engine, at least one or more of the high, intermediate and low pressure sections including:

a superheating element in which a fluid is superheated, a drum element to contain the fluid at a saturated state, a conduit by which the fluid is communicated from the drum element to the superheating element, and a valve operably disposed along the conduit and closeable by a controller to isolate the superheating element from the drum element when the controller, which is configured to determine that a risk of condensate formation at the superheating element exists due to an exhaust temperature of the gas turbine engine exceeding a temperature of fluid to be supplied from the drum element to the superheating element, determines that the risk exists based on input data reflective of temperature and pressure measurements of the exhaust and condition measurements in the drum and superheating elements.

14. The heat recovery steam generator according to claim 13, wherein the valve is closed by the controller during purge events, gas turbine engine forced cooling events and gas turbine engine shut down events.

* * * * *